US012283256B2

(12) United States Patent
Wang

(10) Patent No.: US 12,283,256 B2
(45) Date of Patent: Apr. 22, 2025

(54) METHOD FOR DETERMINING PIXEL VOLTAGE, ELECTRONIC DEVICE, AND STORAGE MEDIUM

(71) Applicant: SHENZHEN CHINA STAR OPTOELECTRONICS SEMICONDUCTOR DISPLAY TECHNOLOGY CO., LTD., Shenzhen (CN)

(72) Inventor: Yanxue Wang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/599,977

(22) PCT Filed: Aug. 18, 2021

(86) PCT No.: PCT/CN2021/113180
§ 371 (c)(1),
(2) Date: Feb. 2, 2023

(87) PCT Pub. No.: WO2023/004895
PCT Pub. Date: Feb. 2, 2023

(65) Prior Publication Data

US 2024/0046896 A1 Feb. 8, 2024

(30) Foreign Application Priority Data

Jul. 30, 2021 (CN) ........................ 202110874340.7

(51) Int. Cl.
*G09G 3/36* (2006.01)

(52) U.S. Cl.
CPC ......... *G09G 3/3607* (2013.01); *G09G 3/3696* (2013.01); *G09G 2320/0242* (2013.01);
(Continued)

(58) Field of Classification Search
CPC .......... G09G 3/2007–2081; G09G 2320/0242; G09G 2320/028; G09G 3/36;
(Continued)

(56) References Cited

U.S. PATENT DOCUMENTS 10,777,153 B1 9/2020 Li
2010/0182336 A1* 7/2010 Haga .................... G09G 3/3607 345/593
(Continued)

FOREIGN PATENT DOCUMENTS

CN 1250342 A 4/2000
CN 101000439 A 7/2007
(Continued)

OTHER PUBLICATIONS

Chinese Office Action issued in corresponding Chinese Patent Application No. 202110874340.7 dated Feb. 28, 2022, pp. 1-11.
(Continued)

*Primary Examiner* — Sanjiv D. Patel
(74) *Attorney, Agent, or Firm* — PV IP PC; Wei Te Chung

(57) ABSTRACT

The present disclosure provides a method for determining a pixel voltage, an electronic device, and a storage medium. The method includes: obtaining an initial color shift ratio of a sub pixel to be tested, obtaining an initial evaluation value of a preset grayscale value, and obtaining a current evaluation value of the preset grayscale value according to a current color shift ratio; comparing the initial evaluation value with the current evaluation value; and determining a standard sub pixel voltage of the sub pixel to be test
(Continued)

according to the current color shift ratio, when the current evaluation value is greater than the initial evaluation value.

17 Claims, 5 Drawing Sheets

(52) U.S. Cl.
CPC ............... *G09G 2320/0276* (2013.01); *G09G 2320/0673* (2013.01); *G09G 2320/068* (2013.01)

(58) Field of Classification Search
CPC .............. G09G 2300/0452; G09G 2320/0271; G09G 2320/0673; G09G 3/3607; G09G 2300/0447; G09G 3/2003; G09G 3/2074; G09G 2320/0276; G09G 5/02; G09G 2340/06; G09G 2320/0666; G02F 1/134363; G02F 1/134309
See application file for complete search history.

(56) References Cited

U.S. PATENT DOCUMENTS

2010/0238101 A1* 9/2010 Jhuo .................... G09G 3/2003 345/88
2021/0264838 A1* 8/2021 Park ..................... G09G 3/3648
2021/0264865 A1* 8/2021 Qiu ...................... G09G 3/3208

FOREIGN PATENT DOCUMENTS

| | | | |
|---|---|---|---|
| CN | 101021638 | A | 8/2007 |
| CN | 103760725 | A | 4/2014 |
| CN | 104330910 | A | 2/2015 |
| CN | 104376828 | A | 2/2015 |
| CN | 104680995 | A | 6/2015 |
| CN | 105632434 | A | 6/2016 |
| CN | 106297716 | A | 1/2017 |
| CN | 110738960 | A | 1/2020 |
| CN | 111091785 | A | 5/2020 |
| CN | 111161678 | A | 5/2020 |
| CN | 111710311 | A | 9/2020 |
| CN | 112198726 | A | 1/2021 |
| CN | 112259056 | A | 1/2021 |
| CN | 112908240 | A | 6/2021 |
| JP | H03231288 | A | 10/1991 |

OTHER PUBLICATIONS

International Search Report in International application No. PCT/CN2021/113180, mailed on Apr. 25, 2022.
Written Opinion of the International Searching Authority in International application No. PCT/CN2021/113180, mailed on Apr. 25, 2022.

* cited by examiner

METHOD FOR DETERMINING PIXEL VOLTAGE, ELECTRONIC DEVICE, AND STORAGE MEDIUM

RELATED APPLICATIONS

This application is a Notional Phase of PCT Patent Application No. PCT/CN2021/113180 having international filing date Aug. 18, 2021, which claims the benefit of priority of Chinese Patent Application No. 202110874340.7 filed on Jul. 30, 2021. The contents of the above applications are all incorporated by reference as if fully set forth herein in their entirety.

TECHNICAL FIELD

The present disclosure relates to the display technology field, and more particularly to a method for determining a pixel voltage, an electronic device, and a storage medium.

BACKGROUND ART

With the development of display technology, display devices are widely used due to advantages of high image quality, power saving, a thin body, and a large viewing angle. The large viewing angle is one of the most important factors affecting consumer experiences.

A liquid crystal display device mainly uses an electric field to control rotation angles of liquid crystal molecules, so that light can pass through the liquid crystal molecules to display images. A vertical alignment (VA) type liquid crystal display panel has advantages of high contrast and a wide viewing angle and an advantage that a rubbing alignment is not required. However, due to the use of vertically aligned liquid crystals, the difference in birefringence of liquid crystal molecules is relatively large. Therefore, the vertical alignment (VA) type liquid crystal display, especially a large-sized liquid crystal display, is prone to a serious color shift problem under large viewing angles. That is, a color shift situation occurs in a side viewing angle. When the side viewing angle is larger, the color shift phenomenon is more obvious.

TECHNICAL PROBLEM

An objective of the present disclosure is to provide a method for determining a pixel voltage, an electronic device, and a storage medium to solve the problem that the color shift is serious in a display panel.

TECHNICAL SOLUTION

The present disclosure provides a method for determining a pixel voltage, including: obtaining a preset grayscale value, an initial color shift ratio, and a current color shift ratio of a sub pixel to be tested; obtaining an initial evaluation value of the preset grayscale value according to the initial color shift ratio, and obtaining a current evaluation value of the preset grayscale value according to the current color shift ratio; comparing the initial evaluation value with the current evaluation value; and determining a standard sub pixel voltage of the sub pixel to be test according to the current color shift ratio, when the current evaluation value is greater than the initial evaluation value.

In the method for determining the pixel voltage of the present disclosure, the step of comparing the initial evaluation value with the current evaluation value includes: obtaining an initial sub pixel voltage corresponding to the initial color shift ratio and a current sub pixel voltage corresponding to the current color shift ratio, when the initial evaluation value is equal to the current evaluation value; comparing the initial sub pixel voltage with the current sub pixel voltage; and determining the initial sub pixel voltage as the standard sub pixel voltage of the sub pixel to be test, when the initial sub pixel voltage is smaller than the current sub pixel voltage.

In the method for determining the pixel voltage of the present disclosure, the step of comparing the initial evaluation value with the current evaluation value includes: determining the standard sub pixel voltage of the sub pixel to be tested according to the initial color shift ratio, when the current evaluation value is smaller than the initial evaluation value.

In the method for determining the pixel voltage of the present disclosure, the preset grayscale value includes at least a first sub grayscale value and a second sub grayscale value; the initial color shift ratio includes at least a first initial color shift ratio and a second initial color shift ratio, the first initial color shift ratio is an initial color shift ratio of the first sub grayscale value, and the second initial color shift ratio is an initial color shift ratio of the second sub grayscale value; the initial evaluation value includes at least a first initial evaluation value and a second initial evaluation value, the first initial evaluation value is an initial evaluation value of the first sub grayscale value, and the second initial evaluation value is an initial evaluation value of the second sub grayscale value; and the step of obtaining the initial evaluation value of the preset grayscale value according to the initial color shift ratio includes: obtaining the first initial evaluation value according to the first initial color shift ratio, and obtaining the second initial evaluation value according to the second initial color shift ratio; comparing the first initial evaluation value with the second initial evaluation value; serving the first initial evaluation value as the initial evaluation value of the preset grayscale value, when the first initial evaluation value is smaller than the second initial evaluation value; and serving the second initial evaluation value as the initial evaluation value of the preset grayscale value, when the first initial evaluation value is greater than the second initial evaluation value.

In the method for determining the pixel voltage of the present disclosure, the current evaluation value includes at least a first current evaluation value and a second current evaluation value, the first current evaluation value is a current evaluation value of the first sub grayscale value, and the second current evaluation value is a current evaluation value of the second sub grayscale value; and the step of comparing the initial evaluation value with the current evaluation value includes: comparing the first initial evaluation value with the first current evaluation value, and comparing the second initial evaluation value with the second current evaluation value; serving the first current evaluation value as a standard evaluation value of the first sub grayscale value, when the first current evaluation value is greater than the first initial evaluation value; serving the second current evaluation value as a standard evaluation value of the second sub grayscale value, when the second current evaluation value is greater than the second initial evaluation value; determining a standard sub pixel voltage of the first sub grayscale value according to the standard evaluation value of the first sub grayscale value and a color shift ratio corresponding to the standard evaluation value, and determining a standard sub pixel voltage of the second sub grayscale value according to the standard evaluation value of the second sub grayscale value and a color shift ratio corresponding to the standard evaluation value; and serving the standard sub pixel voltage of the first sub grayscale value and the standard sub pixel voltage of the second sub grayscale value as the standard sub pixel voltage of the sub pixel to be tested.

In the method for determining the pixel voltage of the present disclosure, the current color shift ratio includes at least a first current color shift ratio and a second current color shift ratio, the first current color shift ratio is a current color shift ratio of the first sub grayscale value, and the second current color shift ratio is a current color shift ratio of the second sub grayscale value; and after the step of comparing the first initial evaluation value with the first current evaluation value, and comparing the second initial evaluation value with the second current evaluation value, the method further includes: comparing the acquired first current evaluation value with the second initial evaluation value and the second current evaluation value; comparing the second current color shift ratio with the second initial color shift ratio, when the second initial evaluation value and the second current evaluation value are both greater than the first current evaluation value; and determining the sub pixel voltage of the second sub grayscale value according to the second current color shift ratio.

In the method for determining the pixel voltage of the present disclosure, the step of obtaining the initial evaluation value of the preset grayscale value according to the initial color shift ratio and obtaining the current evaluation value of the preset grayscale value according to the current color shift ratio includes: obtaining angle data within a preset angle range; obtaining initial measured gamma shift data according to the initial color shift ratio and the angle data, and obtaining current measured gamma shift data according to the current color shift ratio and the angle data; obtaining an initial evaluation angle is obtained according to a preset gamma shift value and the measured gamma shift data, and obtaining a current evaluation angle according to the preset gamma shift value and the current gamma offset data; and obtaining the initial evaluation value according to a preset standard angle, and obtaining the current evaluation value according to the preset standard angle and the current evaluation angle.

The present disclosure provides an electronic device. The electronic device includes: one or more processors; a memory; and one or more applications, wherein the one or more applications are stored in the memory and configured to be executed by the processor to perform the following steps of: obtaining a preset grayscale value, an initial color shift ratio, and a current color shift ratio of a sub pixel to be tested; obtaining an initial evaluation value of the preset grayscale value according to the initial color shift ratio, and obtaining a current evaluation value of the preset grayscale value according to the current color shift ratio; comparing the initial evaluation value with the current evaluation value; and determining a standard sub pixel voltage of the sub pixel to be test according to the current color shift ratio, when the current evaluation value is greater than the initial evaluation value.

In the electronic device of the present disclosure, the step of comparing the initial evaluation value with the current evaluation value includes: obtaining an initial sub pixel voltage corresponding to the initial color shift ratio and a current sub pixel voltage corresponding to the current color shift ratio, when the initial evaluation value is equal to the current evaluation value; comparing the initial sub pixel voltage with the current sub pixel voltage; and determining the initial sub pixel voltage as the standard sub pixel voltage of the sub pixel to be test, when the initial sub pixel voltage is smaller than the current sub pixel voltage.

In the electronic device of the present disclosure, the step of comparing the initial evaluation value with the current evaluation value includes: determining the standard sub pixel voltage of the sub pixel to be tested according to the initial color shift ratio, when the current evaluation value is smaller than the initial evaluation value.

In the electronic device of the present disclosure, the preset grayscale value includes at least a first sub grayscale value and a second sub grayscale value; the initial color shift ratio includes at least a first initial color shift ratio and a second initial color shift ratio, the first initial color shift ratio is an initial color shift ratio of the first sub grayscale value, and the second initial color shift ratio is an initial color shift ratio of the second sub grayscale value; the initial evaluation value includes at least a first initial evaluation value and a second initial evaluation value, the first initial evaluation value is an initial evaluation value of the first sub grayscale value, and the second initial evaluation value is an initial evaluation value of the second sub grayscale value; and the step of obtaining the initial evaluation value of the preset grayscale value according to the initial color shift ratio includes: obtaining the first initial evaluation value according to the first initial color shift ratio, and obtaining the second initial evaluation value according to the second initial color shift ratio; comparing the first initial evaluation value with the second initial evaluation value; serving the first initial evaluation value as the initial evaluation value of the preset grayscale value, when the first initial evaluation value is smaller than the second initial evaluation value; and serving the second initial evaluation value as the initial evaluation value of the preset grayscale value, when the first initial evaluation value is greater than the second initial evaluation value.

In the electronic device of the present disclosure, the current evaluation value includes at least a first current evaluation value and a second current evaluation value, the first current evaluation value is a current evaluation value of the first sub grayscale value, and the second current evaluation value is a current evaluation value of the second sub grayscale value; and the step of comparing the initial evaluation value with the current evaluation value includes: comparing the first initial evaluation value with the first current evaluation value, and comparing the second initial evaluation value with the second current evaluation value; serving the first current evaluation value as a standard evaluation value of the first sub grayscale value, when the first current evaluation value is greater than the first initial evaluation value; serving the second current evaluation value as a standard evaluation value of the second sub grayscale value, when the second current evaluation value is greater than the second initial evaluation value; determining a standard sub pixel voltage of the first sub grayscale value according to the standard evaluation value of the first sub grayscale value and a color shift ratio corresponding to the standard evaluation value, and determining a standard sub pixel voltage of the second sub grayscale value according to the standard evaluation value of the second sub grayscale value and a color shift ratio corresponding to the standard evaluation value; and serving the standard sub pixel voltage of the first sub grayscale value and the standard sub pixel voltage of the second sub grayscale value as the standard sub pixel voltage of the sub pixel to be tested.

In the electronic device of the present disclosure, the current color shift ratio includes at least a first current color shift ratio and a second current color shift ratio, the first current color shift ratio is a current color shift ratio of the first sub grayscale value, and the second current color shift ratio is a current color shift ratio of the second sub grayscale value; and after the step of comparing the first initial evaluation value with the first current evaluation value, and comparing the second initial evaluation value with the second current evaluation value, the method further includes: comparing the acquired first current evaluation value with the second initial evaluation value and the second current evaluation value; comparing the second current color shift ratio with the second initial color shift ratio, when the second initial evaluation value and the second current evaluation value are both greater than the first current evaluation value; and determining the sub pixel voltage of the second sub grayscale value according to the second current color shift ratio.

In the electronic device of the present disclosure, the step of obtaining the initial evaluation value of the preset grayscale value according to the initial color shift ratio and obtaining the current evaluation value of the preset grayscale value according to the current color shift ratio includes: obtaining angle data within a preset angle range; obtaining initial measured gamma shift data according to the initial color shift ratio and the angle data, and obtaining current measured gamma shift data according to the current color shift ratio and the angle data; obtaining an initial evaluation angle is obtained according to a preset gamma shift value and the measured gamma shift data, and obtaining a current evaluation angle according to the preset gamma shift value and the current gamma offset data; and obtaining the initial evaluation value according to a preset standard angle, and obtaining the current evaluation value according to the preset standard angle and the current evaluation angle.

The present disclosure provides a computer readable storage medium including computer programs stored thereon. The computer programs are loaded by a processor to perform the following steps of: obtaining a preset grayscale value, an initial color shift ratio, and a current color shift ratio of a sub pixel to be tested; obtaining an initial evaluation value of the preset grayscale value according to the initial color shift ratio, and obtaining a current evaluation value of the preset grayscale value according to the current color shift ratio; comparing the initial evaluation value with the current evaluation value; and determining a standard sub pixel voltage of the sub pixel to be test according to the current color shift ratio, when the current evaluation value is greater than the initial evaluation value.

In the computer readable storage medium of the present disclosure, the step of comparing the initial evaluation value with the current evaluation value includes: obtaining an initial sub pixel voltage corresponding to the initial color shift ratio and a current sub pixel voltage corresponding to the current color shift ratio, when the initial evaluation value is equal to the current evaluation value; comparing the initial sub pixel voltage with the current sub pixel voltage; and determining the initial sub pixel voltage as the standard sub pixel voltage of the sub pixel to be test, when the initial sub pixel voltage is smaller than the current sub pixel voltage.

In the computer readable storage medium of the present disclosure, the step of comparing the initial evaluation value with the current evaluation value includes: determining the standard sub pixel voltage of the sub pixel to be tested according to the initial color shift ratio, when the current evaluation value is smaller than the initial evaluation value.

In the computer readable storage medium of the present disclosure, the preset grayscale value includes at least a first sub grayscale value and a second sub grayscale value; the initial color shift ratio includes at least a first initial color shift ratio and a second initial color shift ratio, the first initial color shift ratio is an initial color shift ratio of the first sub grayscale value, and the second initial color shift ratio is an initial color shift ratio of the second sub grayscale value; the initial evaluation value includes at least a first initial evaluation value and a second initial evaluation value, the first initial evaluation value is an initial evaluation value of the first sub grayscale value, and the second initial evaluation value is an initial evaluation value of the second sub grayscale value; and the step of obtaining the initial evaluation value of the preset grayscale value according to the initial color shift ratio includes: obtaining the first initial evaluation value according to the first initial color shift ratio, and obtaining the second initial evaluation value according to the second initial color shift ratio; comparing the first initial evaluation value with the second initial evaluation value; serving the first initial evaluation value as the initial evaluation value of the preset grayscale value, when the first initial evaluation value is smaller than the second initial evaluation value; and serving the second initial evaluation value as the initial evaluation value of the preset grayscale value, when the first initial evaluation value is greater than the second initial evaluation value.

In the computer readable storage medium of the present disclosure, the current evaluation value includes at least a first current evaluation value and a second current evaluation value, the first current evaluation value is a current evaluation value of the first sub grayscale value, and the second current evaluation value is a current evaluation value of the second sub grayscale value; and the step of comparing the initial evaluation value with the current evaluation value includes: comparing the first initial evaluation value with the first current evaluation value, and comparing the second initial evaluation value with the second current evaluation value; serving the first current evaluation value as a standard evaluation value of the first sub grayscale value, when the first current evaluation value is greater than the first initial evaluation value; serving the second current evaluation value as a standard evaluation value of the second sub grayscale value, when the second current evaluation value is greater than the second initial evaluation value; determining a standard sub pixel voltage of the first sub grayscale value according to the standard evaluation value of the first sub grayscale value and a color shift ratio corresponding to the standard evaluation value, and determining a standard sub pixel voltage of the second sub grayscale value according to the standard evaluation value of the second sub grayscale value and a color shift ratio corresponding to the standard evaluation value; and serving the standard sub pixel voltage of the first sub grayscale value and the standard sub pixel voltage of the second sub grayscale value as the standard sub pixel voltage of the sub pixel to be tested.

In the computer readable storage medium of the present disclosure, the current color shift ratio includes at least a first current color shift ratio and a second current color shift ratio, the first current color shift ratio is a current color shift ratio of the first sub grayscale value, and the second current color shift ratio is a current color shift ratio of the second sub grayscale value; and after the step of comparing the first initial evaluation value with the first current evaluation value, and comparing the second initial evaluation value with the second current evaluation value, the method further includes: comparing the acquired first current evaluation value with the second initial evaluation value and the second current evaluation value; comparing the second current color shift ratio with the second initial color shift ratio, when the second initial evaluation value and the second current evaluation value are both greater than the first current evaluation value; and determining the sub pixel voltage of the second sub grayscale value according to the second current color shift ratio.

ADVANTAGEOUS EFFECTS

The advantageous effects are described as follows. The corresponding initial evaluation value and the current evaluation value are respectively obtained according to the initial color shift ratio and the current color shift ratio. The initial evaluation value is compared with the current evaluation value. When the current evaluation value is greater than the initial evaluation value, the standard sub pixel voltage of the sub pixel to be tested is determined according to the current color shift ratio. The evaluation value can evaluate a gamma shift value of a front viewing angle and a side viewing angle of a corresponding grayscale. When the evaluation value is increased, it represents that the gamma shift performance becomes better and the color shift is reduced. Therefore, the sub pixel voltage corresponding to the current color shift ratio is served as the standard sub pixel voltage of the sub pixel and outputted, so that the color shift is reduced and it is beneficial for increasing display characteristics of the display panel in a large viewing angle.

BRIEF DESCRIPTION OF DRAWINGS

The technical solution and the beneficial effects of the present disclosure are best understood from the following detailed description with reference to the accompanying figures and embodiments.

DETAILED DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

In the description of the present disclosure, the terms "first" and "second" are merely intended for a purpose of description, and shall not be understood as an indication or implication of relative importance or implicit indication of the number of indicated technical features. Therefore, a feature limited by "first" or "second" may explicitly or implicitly include at least one of the features. In the descriptions of the present disclosure, "multiple" means at least two, such as, two, three, or more, unless there is a specific limitation.

Some terms in the embodiments of the present disclosure are first described to help those skilled in the art have a better understanding.

A multi-domain pixel design refers to that rotation angles of liquid crystal molecules in a multiple domains of a main pixel electrode (PE_main) and in a multiple domains of a sub pixel electrode (PE_Sub) in the same sub pixel are different, so as to achieve an objective of improving the color shift. An 8-domain pixel design is taken as an example. A display panel includes a plurality of sub pixel units arranged in an array in the display panel. Each of the sub pixel units to be tested includes a main pixel and a sub pixel. The main pixel includes a main pixel electrode, and the sub pixel includes a sub pixel electrode. The main pixel electrode and the sub pixel electrode both have an 8-domain structure.

A low color shift (LCS) designs refers to that a corresponding chip algorithm is used to divide two adjacent sub pixels into a main pixel and a sub pixel, and then different voltages are respectively applied to the main sub pixel and the sub pixel to improve color distortion in a large viewing angle. This method is generally called as the low color shift design. An LCS value is a ratio of a pixel voltage in a sub area to a pixel voltage in a main area.

Embodiments of the present disclosure provide a data processing method, a device, an electronic device, and a storage medium which are described in detail as follows.

Figure 1:
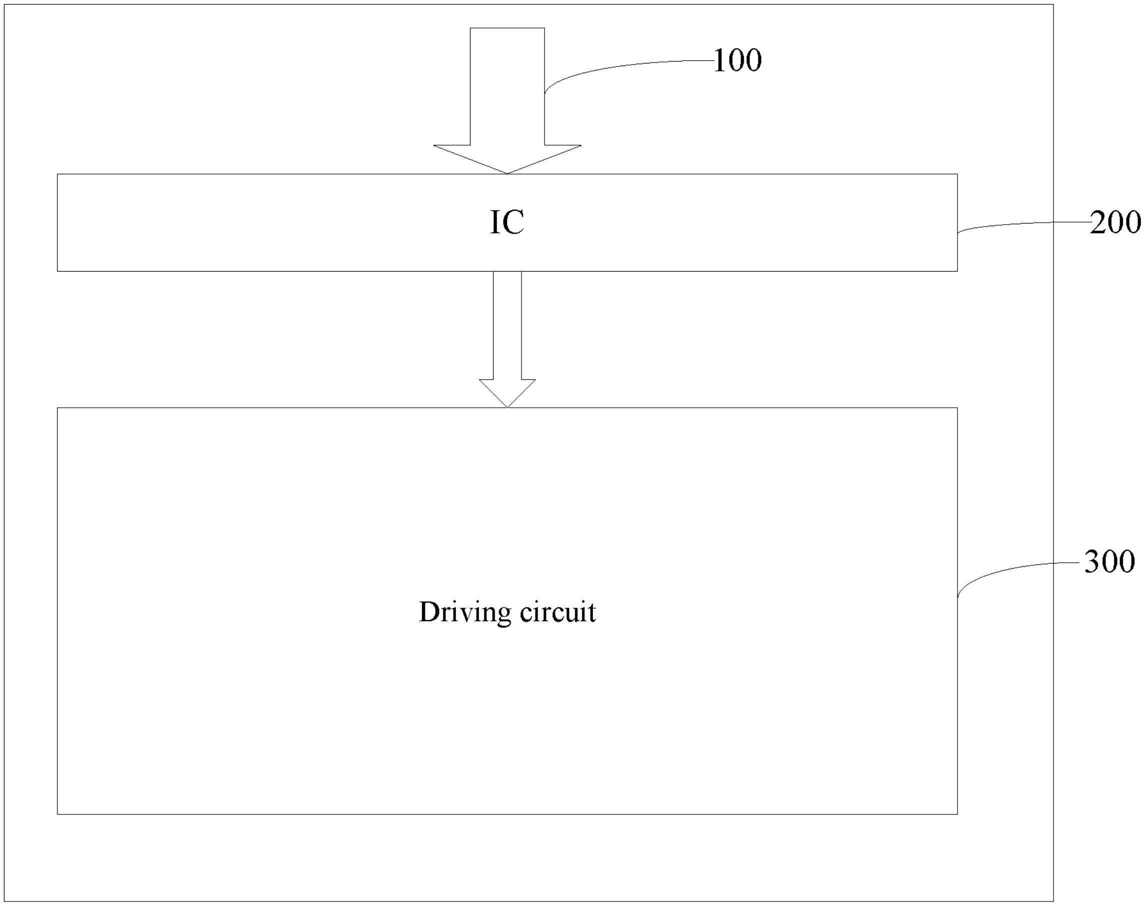
FIG. 1 illustrates an architecture diagram of a system for determining a pixel voltage provided by an embodiment of the present disclosure.

The following introduces a method for determining a pixel voltage applied to a display panel as an example. Please refer to FIG. 1. FIG. 1 illustrates an architecture diagram of a system for determining a pixel voltage in accordance with an embodiment of the present disclosure. The display panel includes an input signal 100, an identification chip (IC) 200, and a driving circuit. The method for determining the pixel voltage is integrated on the identification chip 200. The identification chip (IC) 200 processes the received input signal 100 and then outputs it to the driving circuit 300.

It is noted that the schematic diagram of the scene of the system for determining the pixel voltage determination system shown in FIG. 1 is only an example. The system for determining the pixel voltage and the scene described in the embodiment of the present disclosure are intended to more clearly describe the technical solutions of the embodiments of the present disclosure but do not constitute a limitation on the technical solutions provided by the embodiments of the present disclosure. Those skilled in the art can know that with the evolution of a glass production data management system and new business scenarios, the technical solutions provided by the embodiments of the present disclosure are suitable for similar technical problems.

Figure 2:
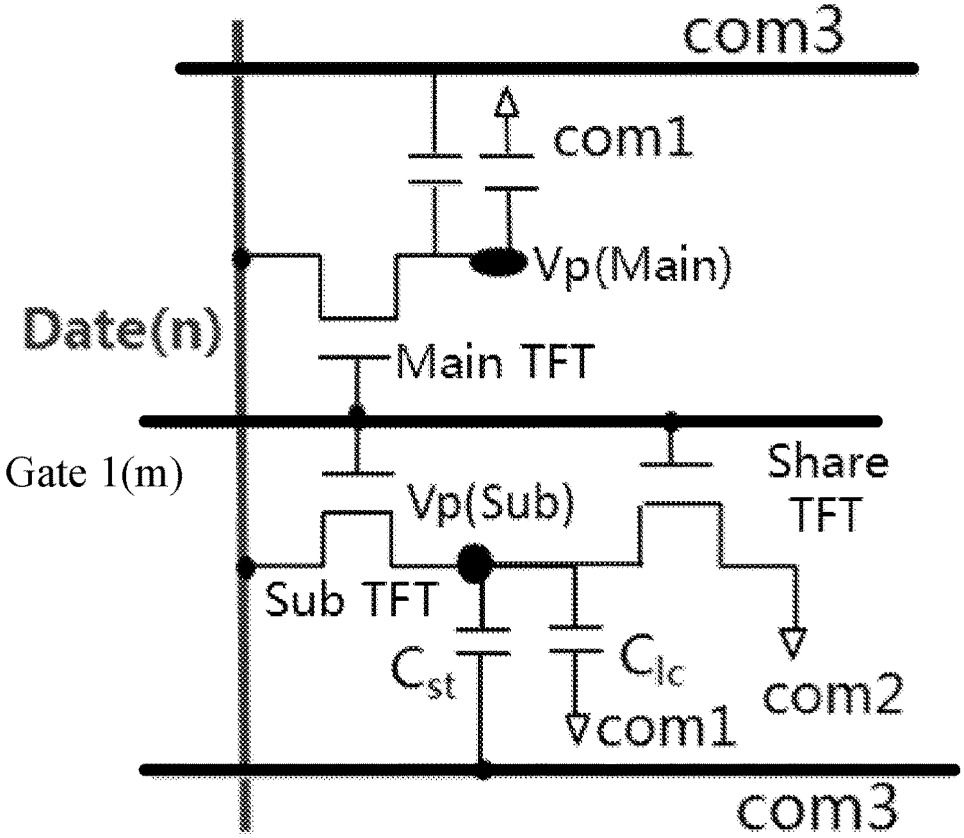
FIG. 2 illustrates an equivalent circuit diagram of a sub pixel provided by an embodiment of the present disclosure.

Please refer to FIG. 2. FIG. 2 illustrates an equivalent circuit diagram of an 8-domain display pixel design. In a 3T mode of the circuit, three thin film transistors (TFTs) include a main thin film transistor, a sub thin film transistor, and a voltage dividing thin film transistor. On an array substrate, a voltage of a main pixel electrode (Com1) is controlled by the main thin film transistor (Main TFT), and a voltage of a sub pixel electrode is controlled by the sub thin film transistor (Sub TFT) and the voltage dividing thin film transistor (Share TFT). A gate electrode of the sub thin film transistor (Sub TFT) is electrically connected to a scan line (Gate1 (m)). A source electrode of the sub thin film transistor (Sub TFT) is electrically connected to the sub pixel electrode (Vp (sub)). A drain electrode of the voltage dividing thin film transistor (Share TFT) is electrically connected to the sub pixel electrode (Vp (sub)). A source electrode of the voltage dividing thin film transistor (Share TFT) is electrically connected to a voltage dividing electrode (Com2). The voltage of the sub pixel is controlled to be lower than the voltage of the main voltage to achieve 8-domain effect. In the circuit, Com2 voltage is externally connected to discharge Com2 to change the voltage of the sub pixel. Accordingly, the externally connected voltage Com2 is changed to achieve different LCSs.

Figure 3:
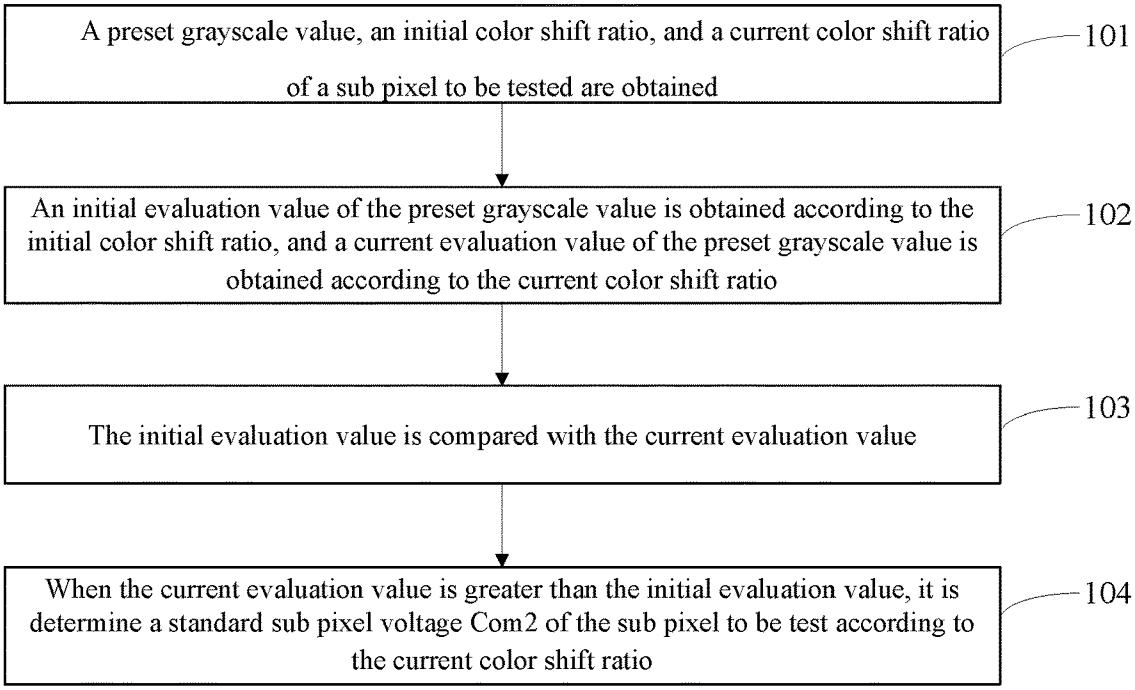
FIG. 3 illustrates a flowchart of a method for determining a pixel voltage provided by an embodiment of the present disclosure.

An embodiment of the present disclosure provides a method for determining a pixel voltage. Please refer to FIG. 3. The method includes the following steps S101-S104.

In step S101, a preset grayscale value, an initial color shift ratio, and a current color shift ratio of a sub pixel to be tested are obtained.

The preset grayscale value of the sub pixel to be tested can be a grayscale value or a set of a plurality of grayscale values.

Exemplarily, when the preset grayscale value is a value, the preset grayscale value can be 0 or 255.

In the present embodiment, a color shift ratio (that is, an LCS value) is a ratio of a sub pixel voltage of the sub pixel to be tested to a main pixel voltage. The color shift ration includes the initial color shift ratio and the current color shift ratio. The initial color shift ratio is a ratio which is obtained before the sub pixel to be tested is adjusted. The current color shift ratio is a ratio which is obtained after the sub pixel to be tested is adjusted.

The current color shift ratio can be obtained by adjusting the initial color shift ratio according to a standard color shift ratio and a preset adjustment ratio. Exemplarily, the standard color shift ratio is LCS=1, and the preset adjustment ratio can be any one of 5%, 10%, 15% and so on. When the initial color shift ratio is 60% of the standard color shift ratio (that is, the initial color shift ratio is 0.6), the initial color shift ratio is adjusted according to the preset adjustment ratio of 15% (that is, 10% is increased on the basis of 0.6). As such, the current color shift ratio is 70% LCS, that is, 0.7.

It can be understood that when the preset adjustment ratio is 5% and the initial color shift ratio is 0.6, the current color shift ratio can be adjusted to 0.55 or 0.65. The present disclosure is not specifically limited herein.

In S102, an initial evaluation value of the preset grayscale value is obtained according to the initial color shift ratio, and a current evaluation value of the preset grayscale value is obtained according to the current color shift ratio.

The evaluation values are used to evaluate gamma shift performance of the preset grayscale value. When point values of the evaluation values are higher, the gamma shift performance of the preset grayscale value is better. That is, a degree of color shift is smaller. When the point values of evaluation values are higher, the gamma shift performance of the preset grayscale value is worse. That is, the degree of color shift is more serious.

Since each of the color shift ratios corresponds to an evaluation value, the evaluation value is changed after the corresponding color shift ratio is adjusted. The initial evaluation value and the current evaluation value are respectively used to evaluate the gamma shift performance (that is, the degree of color shift) of the preset grayscale value before and after the adjustment.

In S103, the initial evaluation value is compared with the current evaluation value.

By comparing the initial evaluation value with the current evaluation value, it is determined whether a change of the gamma shift performance of the preset grayscale value before and after the color shift ratio is adjusted.

In S104, when the current evaluation value is greater than the initial evaluation value, it is determine a standard sub pixel voltage Com2 of the sub pixel to be test according to the current color shift ratio.

Since the color shift ratio (that is, the LCS value) is the ratio of the sub pixel voltage of the sub pixel to be tested and the main pixel voltage, the color shift ratio can be adjusted by adjusting the sub pixel voltage when the main pixel voltage Vp (main) is not changed.

Exemplarily, it is assumed that the initial evaluation value corresponding to an initial evaluation angle is 23.6, the initial color shift ratio is 0.6, the current evaluation value corresponding to a current evaluation angle is 29.7, and the current color shift ratio is 0.7. The current evaluation value is greater than the initial evaluation value. That is, the current performance of the preset grayscale value is better than the initial performance of the preset grayscale value. It represents that the performance of the sub pixel is better after the adjustment. Accordingly, the sub pixel voltage corresponding to the current color shift ratio is used as the standard sub pixel voltage Com2 of the preset grayscale value.

In the method for determining the sub pixel voltage provided by the embodiment of the present disclosure, the corresponding initial evaluation value and the current evaluation value are respectively obtained according to the initial color shift ratio and the current color shift ratio. The initial evaluation value is compared with the current evaluation value. When the current evaluation value is greater than the initial evaluation value, the standard sub pixel voltage Com2 of the sub pixel to be tested is determined according to the current color shift ratio. The evaluation value can evaluate a gamma shift value of a front viewing angle and a side viewing angle of a corresponding grayscale. When the evaluation value is increased, it represents that the gamma shift performance becomes better and the color shift is reduced. Therefore, the sub pixel voltage corresponding to the current color shift ratio is served as the standard sub pixel voltage Com2 of the sub pixel and outputted, so that the color shift is reduced and it is beneficial for increasing display characteristics of the display panel in a large viewing angle.

In some embodiments, after the current evaluation value is greater than the initial evaluation value in step 104, the method further includes the following steps.

In step 1), the current evaluation value is used as the initial evaluation value, and steps 102 to 103 are repeated until a maximum value of the current evaluation value is obtained.

In step 2), the current color shift ratio is determined according to the maximum value of the current evaluation value, and the standard sub pixel voltage of the sub pixel to be tested is determined according to the current color shift ratio.

By repeating the iteration steps, a better current evaluation value can be determined, so that a better standard sub pixel voltage of the sub pixel is obtained and it is beneficial for further improving the display characteristics of the display panel in the large viewing angle.

In some embodiments, the step of obtaining the initial evaluation value of the preset grayscale value according to the initial color shift ratio and obtaining the current evaluation value of the preset grayscale value according to the current color shift ratio in step S102 includes the following steps S201-S204.

In S201, angle data within a preset angle range is obtained.

The preset angle range can include a front viewing angle and a side viewing angle. The front viewing angle is an angle of viewing the display panel from the front. The front viewing angle is 0°. The side viewing angle is an angle of viewing the display panel from one side. The side viewing angle is ranged from 0° to 90°.

In the embodiment of the present disclosure, the preset angle range is from 0° to 70°, and the angle data includes all side viewing angles from 0° to 70°.

In S202, initial measured gamma shift data is obtained according to the initial color shift ratio and the angle data, and current measured gamma shift data is obtained according to the current color shift ratio and the angle data.

For each preset grayscale value, each preset grayscale value has a measured brightness and an ideal normalized brightness at each side viewing angle. The ideal normalized brightness is a brightness which is calculated and obtained at a corresponding side viewing angle when it is assumed that a gamma value at the side viewing angle is consistent with a gamma value at the front viewing angle, that is, 0° (that is, the side viewing angle does not have the gamma shift).

Exemplarily, the measured brightness and normalized brightness can be respectively expressed by the following formulas:

the measured brightness $LV1(\text{gray-angle})=(LV(\text{gray-angle})/LV(255-\text{angle}0)$; and the normalized brightness $LV\text{ref}(\text{gray-angle})=LV(255-\text{angle})\times(\text{gray}/255)GM(\text{gray-angle}0)$.

In the normalized brightness, an exponent in the multiplier (gray/255) GM (gray-angle0) is GM (gray-angle0). The gamma shift data is a gamma shift value of the measured brightness and the normalized brightness at each side viewing angle, and then an absolute value of the gamma shift value is obtained. The gamma shift data includes the initial measured gamma shift data and the current measured gamma shift data.

Figure 4:
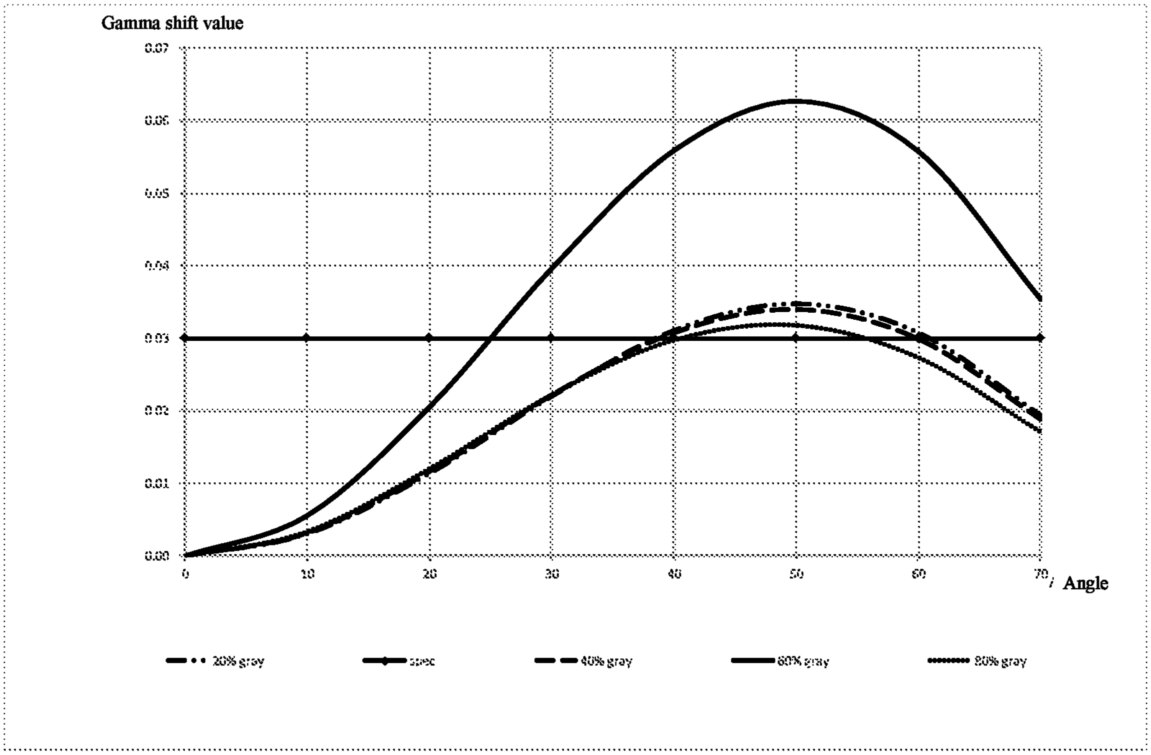
FIG. 4 illustrates a mapping relationship of side viewing angles of different sub pixels and gamma offset data provided by an embodiment of the present disclosure.

Exemplarily, when the preset angle range is from 0° to 70°, a mapping relationship of different side viewing angles and gamma offset data, that is, a gamma shift curve, is shown in FIG. 4.

In S203, an initial evaluation angle is obtained according to a preset gamma shift value and the measured gamma shift data, and a current evaluation angle is obtained according to the preset gamma shift value and the current gamma offset data.

Each side viewing angle corresponds to a gamma shift curve according to the mapping relationship of the side viewing angles and the gamma shift data. The preset gamma shift value can also be a preset value in the gamma shift data. A side viewing angle corresponding to an intersection of a line with the preset gamma offset value of 0.03 and the gamma shift curve is served as an evaluation angle of the preset grayscale. The evaluation angle includes the initial evaluation angle and the current evaluation angle.

In S204, the initial evaluation value is obtained according to a preset standard angle and the initial evaluation angle, and the current evaluation value is obtained according to the preset standard angle and the current evaluation angle.

The preset standard angle can be within the preset angle range, that is, a value from 0° to 70°. Exemplarily, the preset standard angle is 70°.

The evaluation value can be based on the preset standard angle. The evaluation angle is used as a point value of the evaluation value. That is, the point value of the evaluation value is used to evaluate the preset grayscale value. For example, when the evaluation angle is close to the preset standard angle, the evaluation value is higher. When a difference of the evaluation angle and the preset standard angle is larger, the evaluation value is lower. Accordingly, the difference of the evaluation angle and the preset standard angle can also be served as the evaluation value of the preset grayscale value. The grayscale value includes the initial evaluation value and the current evaluation value.

Exemplarily, the preset standard angle is 70°, the initial evaluation angle is 23.6°, and the current evaluation angle is 29.0°. The initial evaluation value corresponding to the initial evaluation angle is 23.6, and the current evaluation value corresponding to the current evaluation angle is 29.0.

In some embodiments, the preset grayscale value includes at least a first sub grayscale value and a second sub grayscale value.

When the preset grayscale value is a set of a plurality of grayscale values, that is, includes a plurality of sub grayscale values, the plurality of sub grayscale values can be multiple values set according to a preset ratio. For example, the sub grayscale values include a 20% grayscale value, a 40% grayscale value, a 60% grayscale value, an 80% grayscale value, and so on. It is assumed that the grayscale value is 255. The 20% grayscale value is a value obtained by multiplying 0.2 by 255 (that is, 51). It can be understood that the 40% grayscale value, the 60% grayscale value, and the 80% grayscale value correspond to 102, 153, and 204, respectively.

In the embodiment of the present disclosure, the first sub grayscale value is the 20% grayscale value, and the second grayscale value is the 40% grayscale value.

Correspondingly, the initial color shift ratio includes at least a first initial color shift ratio and a second initial color shift ratio. The first initial color shift ratio is an initial color shift ratio of the first sub grayscale value, and the second initial color shift ratio is an initial color shift ratio of the second sub grayscale value.

Correspondingly, the initial evaluation value includes at least a first initial evaluation value and a second initial evaluation value. The first initial evaluation value is an initial evaluation value of the first sub grayscale value, and the second initial evaluation value is an initial evaluation value of the second sub grayscale value.

Figure 5:
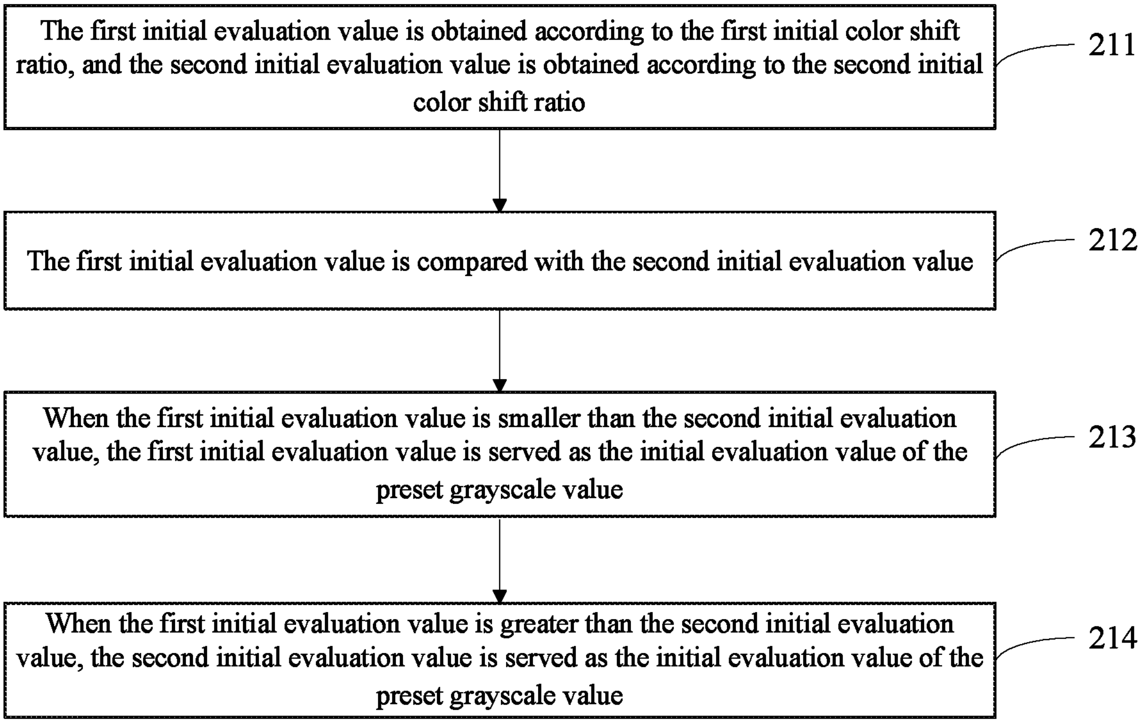
FIG. 5 illustrates a flowchart of step S201 in the method for determining the pixel voltage provided by an embodiment of the present disclosure.

Please refer to FIG. 5. The step of obtaining the initial evaluation value of the preset grayscale value according to the initial color shift ratio in step 102 further includes the following steps S211-S214.

In S211, the first initial evaluation value is obtained according to the first initial color shift ratio, and the second initial evaluation value is obtained according to the second initial color shift ratio.

Exemplarily, when the first color shift ratio and the second color shift ratio are both 60%, that is, when the initial color shift ratios corresponding to the 20% grayscale value and the 40% grayscale value are both 60%, the obtained initial evaluation value corresponding to the 20% grayscale value is 39.5, and the initial evaluation value corresponding to the 40% grayscale value is 70.

In S212, the first initial evaluation value is compared with the second initial evaluation value.

By comparing the initial evaluation value corresponding to the 20% grayscale value and the initial evaluation value corresponding to the 40% grayscale value, one of the two initial evaluation values is selected as a standard initial evaluation value.

In S213, when the first initial evaluation value is smaller than the second initial evaluation value, the first initial evaluation value is served as the initial evaluation value of the preset grayscale value.

In the present embodiment, the initial evaluation value corresponding to the 20% grayscale value is 39.5, and the initial evaluation value corresponding to the 40% grayscale value is 70. That is, the first initial evaluation value is smaller than the second initial evaluation value. A smaller one of the two evaluation values is served as the standard initial evaluation value. That is, the initial evaluation value of the preset grayscale value is 39.5.

In S214, when the first initial evaluation value is greater than the second initial evaluation value, the second initial evaluation value is served as the initial evaluation value of the preset grayscale value.

It can be understood that when the sub grayscale values in the preset grayscale value are greater than two, for example, when the preset grayscale value includes a first gray-scale value, a second gray-scale value, a third gray-scale value, and a fourth grayscale value, a first initial evaluation value, a second initial evaluation value, a third initial evaluation value, and a fourth initial evaluation value corresponding to the four sub grayscale values are respectively obtained. Then, a smallest one of the initial evaluation values corresponding to the four sub grayscale values is served as the initial evaluation value of the preset grayscale value. Exemplarily, the first initial evaluation value, the second initial evaluation value, the third initial evaluation value, and the fourth initial evaluation value are 40.4, 70.0, 26.5, and 70, respectively. Accordingly, the initial evaluation value of the preset grayscale value is 26.5.

TABLE 1

| | LCS | | |
|---|---|---|---|
| Gray | 70% | 65% | 60% |
| 20% gray | 40.4 | 39.5 | 38.6 |
| 40% gray | 70.0 | 70.0 | 70.0 |
| 60% gray | 26.5 | 29.0 | 36.3 |
| 80% gray | 70.0 | 70.0 | 26.8 |

Exemplarily, Table 1 shows a relationship table of different grayscale values and corresponding evaluation values. For a 20% grayscale value (20% gray), a 40% grayscale value (40% gray), a 60% grayscale value (60% gray), and an 80% grayscale value (80% gray), the initial color shift ratio, that is, the initial LCS value is set as 70%, and the initial evaluation value is 26.5. After an adjustment, the LCS value corresponding to the 20% grayscale value, the 40% grayscale value, and the 60% grayscale value is set as 60%, and the LCS value corresponding to the 80% grayscale value is set as 65%. At this time, the current evaluation value can be increased to 36.3. That is, the gamma shift performance becomes better, and the color shift is reduced.

In some embodiments, the current evaluation value includes at least a first current evaluation value and a second current evaluation value. The first current evaluation value is a current evaluation value of the first sub grayscale value, and the second current evaluation value is a current evaluation value of the second sub grayscale value.

In some embodiments, the step of comparing the initial evaluation value with the current evaluation value in step S103 further includes the following steps S301-S303.

In S301, when the initial evaluation value is equal to the current evaluation value, an initial sub pixel voltage corresponding to the initial color shift ratio and a current sub pixel voltage corresponding to the current color shift ratio are obtained.

When the initial evaluation value is 70, the current evaluation value is also 70 after the LCS value is adjusted. That is, the adjustment of the LCS does not improve the gamma performance of the preset grayscale value. At this time, the initial sub pixel voltage and the current sub pixel voltage are respectively obtained.

In S302, the initial sub pixel voltage is compared with the current sub pixel voltage.

By comparing the initial sub pixel voltage with the current sub pixel voltage, the standard sub pixel voltage Com2 of the sub pixel to be tested is obtained and determined.

In S303, when the initial sub pixel voltage is smaller than the current sub pixel voltage, the initial sub pixel voltage is determined as the standard sub pixel voltage of the sub pixel to be test.

In a situation that the adjustment of the LCS does not improve the gamma performance of the preset grayscale value, the initial sub pixel voltage is smaller than the current sub pixel voltage. A smaller one of the two voltages is selected as the standard sub pixel voltage Com2 of the sub pixel to be test. Selecting the smaller one is beneficial for saving energy and increasing display efficiency.

Certainly, step S302 can also include the following step.

In S304, when the initial sub pixel voltage is greater than the current sub pixel voltage, the current sub pixel voltage is determined as the standard sub pixel voltage of the sub pixel to be tested.

In some embodiments, the step of comparing the initial evaluation value with the current evaluation value in step S103 further includes the following step S304.

In S304, when the current evaluation value is smaller than the initial evaluation value, the standard sub pixel voltage of the sub pixel to be tested is determined according to the initial color shift ratio.

When the initial evaluation value is 70, the current evaluation value is also 70 after the LCS value is adjusted. That is, the adjustment of the LCS does not improve the gamma performance of the preset grayscale value. At this time, the initial sub pixel voltage corresponding to the initial color shift ratio is served as the standard sub pixel voltage Com2 of the preset grayscale value.

The step of comparing the initial evaluation value with the current evaluation value in step S103 further includes the following steps S305-S309.

In S305, the first initial evaluation value is compared with the first current evaluation value, and the second initial evaluation value is compared with the second current evaluation value.

A standard evaluation value (that is, a final evaluation value) of the first sub grayscale value is determined by comparing the first initial evaluation value with the first current evaluation value, and a standard evaluation value (that is, a final evaluation value) of the second sub grayscale value is determined by comparing the second initial evaluation value with the second current evaluation value, so as to determine whether to adjust the gamma shift performance of the first sub grayscale value and the gamma shift performance of the second sub grayscale value. As such, the best performance of the gamma shift value of the first sub grayscale value and the best performance of the gamma shift value of the second sub grayscale value can be obtained. This is beneficial for implementing reduction of the color shift.

In S306, when the first current evaluation value is greater than the first initial evaluation value, the first current evaluation value is served as the standard evaluation value of the first sub grayscale value.

In S307, when the second current evaluation value is greater than the second initial evaluation value, the second current evaluation value is served as the standard evaluation value of the second sub grayscale value.

Figure 6:
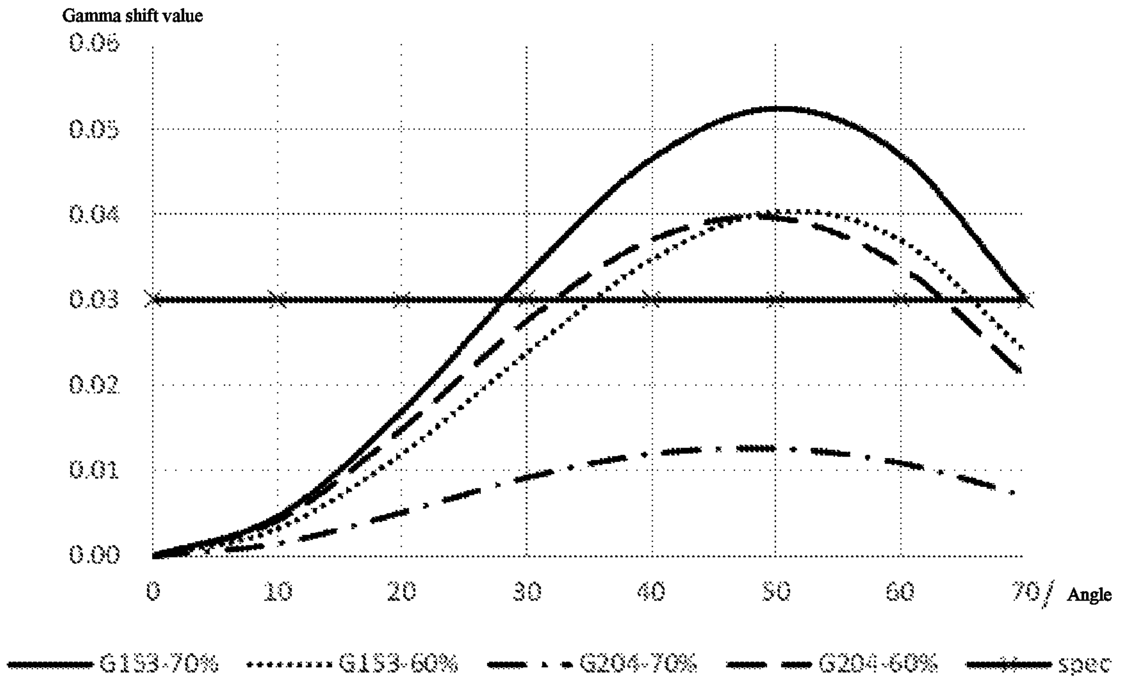
FIG. 6 illustrates a schematic diagram of gamma shift values of different sub grayscale values before and after an adjustment provided by an embodiment of the present disclosure.

Exemplarily, please refer to FIG. 6, it is assumed that the first sub grayscale value is a 60% grayscale value G153, and the second sub grayscale value is a 60% grayscale value G204. Initial LCS values of the first sub grayscale value G153 and the second sub grayscale value G204 are 70%, that is, 0.7. The first initial color shift ratio and the second initial color shift ratio are both 0.7. At this time, the first initial evaluation value corresponding to the first sub grayscale value G153 is 26.5, and the second initial evaluation value corresponding to the second sub grayscale value G204 is 70.

After an adjustment, the current LCS values of the first sub grayscale value G153 and the second sub grayscale value are adjusted as 60%. That is, the first current color shift ratio and the second current color shift ratio are both 0.6. At this time, the first current evaluation value corresponding to the first sub grayscale value G153 becomes 36.3, and the second current evaluation value corresponding to the second sub grayscale value G204 becomes 26.8.

It is found by comparison that the first current evaluation value corresponding to the first sub grayscale value G153 is greater than the first initial evaluation value (that is, the gamma performance is better after the first sub grayscale value is adjusted), while the second current evaluation value corresponding to second sub grayscale value G204 is smaller than the second initial evaluation value (that is, the gamma performance is worse after the second sub grayscale value is adjusted). The first initial color shift ratio is not the best color shift ratio of the first sub grayscale value, and the second current color shift ratio is not the best color shift ratio of the second sub grayscale value. Therefore, the first current color shift ratio of the first sub grayscale value and the second current color shift ratio of the second sub grayscale value are given up.

It can be understood that the first sub grayscale value and the second sub grayscale value are adjusted for multiple times to determine, by repeating steps S305-S309, the standard evaluation value of the first sub grayscale value and the standard evaluation value of the second sub grayscale value respectively. That is, the best color shift ratio of the first sub grayscale value and the best color shift ratio of the second sub grayscale value can be determined respectively.

In 308, a standard sub pixel voltage of the first sub grayscale value is determined according to the standard evaluation value of the first sub grayscale value and a color shift ratio corresponding to the standard evaluation value, and a standard sub pixel voltage of the second sub grayscale value is determined according to the standard evaluation value of the second sub grayscale value and a color shift ratio corresponding to the standard evaluation value.

In S309, the standard sub pixel voltage of the first sub grayscale value and the standard sub pixel voltage of the second sub grayscale value are served as the standard sub pixel voltage of the sub pixel to be tested.

A sub pixel voltage corresponding to a best LCS 20% grayscale is set as a Com2*a*. A sub pixel voltage corresponding to a best LCS 40% grayscale is set as a Com2*b*. A sub pixel voltage corresponding to a best LCS 60% grayscale is set as a Com2*c*. A sub pixel voltage corresponding to a best LCS 80% grayscale is set as a Com2*d*. The sub pixel voltages corresponding to the best gamma shift performance of the different sub grayscale values are combined to output the standard sub pixel voltage Com2 of the sub pixel. That is, Com2*a* Com2*b*, Com2*c*, and Com2*d* are combined to the Com2, and the Com2 is outputted to implementing the best performance of the gamma shift.

In some embodiments, the current color shift ratio includes at least a first current color shift ratio and a second current color shift ratio. The first current color shift ratio is the current color shift ratio of the first sub grayscale value, and the second current color shift ratio is the current color shift ratio of the second sub grayscale value.

After the step of comparing the first initial evaluation value with the first current evaluation value, and comparing the second initial evaluation value with the second current evaluation value in S305, the method further includes the following steps.

In S311, the acquired first current evaluation value is compared with the second initial evaluation value and the second current evaluation value.

After the sub pixel voltage corresponding to the first sub grayscale value having the best gamma shift performance is determined, the sub pixel voltage corresponding to the second sub grayscale value having the best gamma shift performance is determined by comparing the first current evaluation value with the second initial evaluation value and the second current evaluation value.

In S312, when the second initial evaluation value and the second current evaluation value are both greater than the first current evaluation value, the second current color shift ratio is compared with the second initial color shift ratio.

The standard evaluation value of the sub pixel is determined by the smallest one of the initial evaluation values or the current evaluation values of different sub grayscale values. Accordingly, when the second initial evaluation value and the second current evaluation value are both greater than the first current evaluation value, it is determined that the first current evaluation value is the standard evaluation value. The evaluation value of the second sub preset grayscale value, that is, the second initial evaluation value or the second initial evaluation value does not affect the standard evaluation value. Therefore, under the premise that the gamma shift performance of the entire sub pixel can be guaranteed, from the perspective of energy saving, the sub pixel voltage of the second sub grayscale value is selected by comparing the second current color shift ratio with the second initial color shift ratio.

In S313, when the second current color shift ratio is smaller than the second initial color shift ratio value, the sub pixel voltage of the second sub grayscale value is determined according to the second current color shift ratio.

The second current color shift ratio is smaller than the second initial color ratio. That is, the current sub pixel voltage of the second sub grayscale value is smaller than the initial sub pixel voltage. Then, a smaller one of the two voltages is selected. That is, the current sub pixel voltage is served as the sub pixel voltage of the sub pixel to be tested. This is beneficial implementing energy saving.

Figure 7:
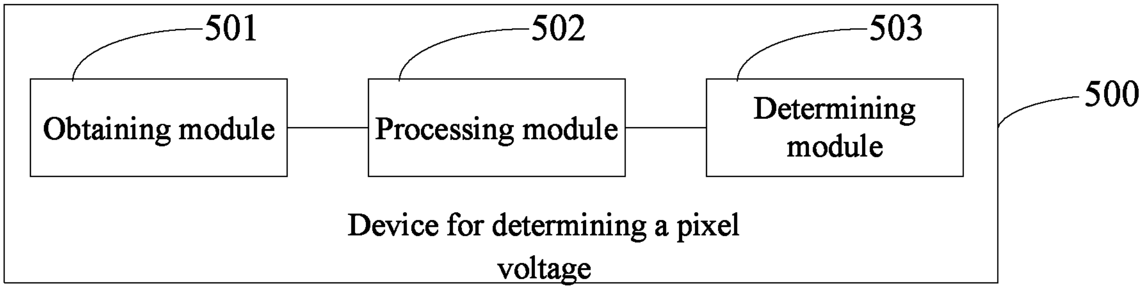
FIG. 7 illustrates a structure diagram of a device for determining a pixel voltage provided by an embodiment of the present disclosure.

In order to better implement the method for determining the pixel voltage in the embodiment of the present disclosure, on the basis of the method for determining the pixel voltage, an embodiment of the present disclosure further provides a device for determining a pixel voltage. As shown in FIG. 7, the device 500 for determining the pixel voltage includes the following modules.

An obtaining module 501 is configured to obtain a preset grayscale value, an initial color shift ratio, and a current color shift ratio of a sub pixel to be tested.

A processing module 502 is configured to obtain an initial evaluation value of the preset grayscale value according to the initial color shift ratio and to obtain a current evaluation value of the preset grayscale value according to the current color shift ratio.

A determining module 503 is configured to compare the initial evaluation value with the current evaluation value. When the current evaluation value is greater than the initial evaluation value, it is determine a standard sub pixel voltage of the sub pixel to be test according to the current color shift ratio.

In some embodiments, the determining module 503 is further configured to: obtain an initial sub pixel voltage corresponding to the initial color shift ratio and a current sub pixel voltage corresponding to the current color shift ratio, when the initial evaluation value is equal to the current evaluation value; compare the initial sub pixel voltage with the current sub pixel voltage; and determine the initial sub pixel voltage as the standard sub pixel voltage of the sub pixel to be test, when the initial sub pixel voltage is smaller than the current sub pixel voltage.

In some embodiments, the determining module 503 is further configured to determine the standard sub pixel voltage of the sub pixel to be tested according to the initial color shift ratio.

In some embodiments, the preset grayscale value includes at least a first sub grayscale value and a second sub grayscale value. The initial color shift ratio includes at least a first initial color shift ratio and a second initial color shift ratio. The first initial color shift ratio is an initial color shift ratio of the first sub grayscale value, and the second initial color shift ratio is an initial color shift ratio of the second sub grayscale value. The initial evaluation value includes at least a first initial evaluation value and a second initial evaluation value. The first initial evaluation value is an initial evaluation value of the first sub grayscale value, and the second initial evaluation value is an initial evaluation value of the second sub grayscale value.

The obtaining module 501 is further configured to: obtain the first initial evaluation value according to the first initial color shift ratio, and obtain the second initial evaluation value according to the second initial color shift ratio; compare the first initial evaluation value with the second initial evaluation value; serve the first initial evaluation value as the initial evaluation value of the preset grayscale value, when the first initial evaluation value is smaller than the second initial evaluation value; and serve the second initial evaluation value as the initial evaluation value of the preset grayscale value, when the first initial evaluation value is greater than the second initial evaluation value.

In some embodiments, the current evaluation value includes at least a first current evaluation value and a second current evaluation value. The first current evaluation value is a current evaluation value of the first sub grayscale value, and the second current evaluation value is a current evaluation value of the second sub grayscale value.

The processing module 502 is further configured to: compare the first initial evaluation value with the first current evaluation value, and compare the second initial evaluation value with the second current evaluation value; serve the first current evaluation value as the standard evaluation value of the first sub grayscale value, when the first current evaluation value is greater than the first initial evaluation value; serve the second current evaluation value as the standard evaluation value of the second sub grayscale value, when the second current evaluation value is greater than the second initial evaluation value; determine the standard sub pixel voltage of the first sub grayscale value according to the standard evaluation value of the first sub grayscale value and the color shift ratio corresponding to the standard evaluation value, and determine the standard sub pixel voltage of the first sub grayscale value according to the standard evaluation value of the second sub grayscale value and the color shift ratio corresponding to the standard evaluation value; and serve the standard sub pixel voltage of the first sub grayscale value and the standard sub pixel voltage of the second sub grayscale value as the standard sub pixel voltage of the sub pixel to be tested.

In some embodiments, the processing module 502 is further configured to: compare the acquired first current evaluation value with the second initial evaluation value and the second current evaluation value; compare the second current color shift ratio with the second initial color shift ratio, when the second initial evaluation value and the second current evaluation value are both greater than the first current evaluation value; and determine the standard sub pixel voltage of the second sub grayscale value according to the second current color shift ratio, when the second current color shift ratio is smaller than the second initial color shift ratio value.

In some embodiments, the processing module 502 is further configured to: obtain angle data within a preset angle range; obtain initial measured gamma shift data according to the initial color shift ratio and the angle data, and obtain current measured gamma shift data according to the current color shift ratio and the angle data; obtain an initial evaluation angle according to a preset gamma shift value and the measured gamma shift data, and obtain a current evaluation angle according to the preset gamma shift value and the current gamma offset data; and obtain the initial evaluation value according to a preset standard angle and the initial evaluation angle, and obtain the current evaluation value according to the preset standard angle and the current evaluation angle.

In the device for determining the sub pixel voltage provided by the embodiment of the present disclosure, the corresponding initial evaluation value and the current evaluation value are respectively obtained according to the initial color shift ratio and the current color shift ratio. The initial evaluation value is compared with the current evaluation value. When the current evaluation value is greater than the initial evaluation value, the standard sub pixel voltage of the sub pixel to be tested is determined according to the current color shift ratio. The evaluation value can evaluate a gamma shift value of a front viewing angle and a side viewing angle of a corresponding grayscale. When the evaluation value is increased, it represents that the gamma shift performance becomes better and the color shift is reduced. Therefore, the sub pixel voltage corresponding to the current color shift ratio is served as the standard sub pixel voltage of the sub pixel and outputted, so that the color shift is reduced and it is beneficial for increasing display characteristics of the display panel in a large viewing angle.

Figure 8:
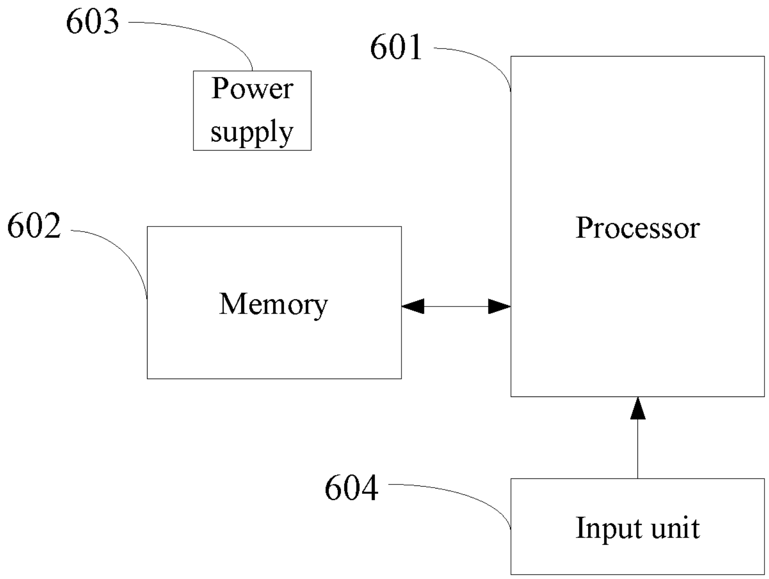
FIG. 8 illustrates a structure diagram of an electronic device provided by an embodiment of the present disclosure.

An embodiment of the present disclosure further provides an electronic device with which the device for determining the pixel voltage in any one of the embodiments of the present disclosure is integrated. Please refer to FIG. 8. FIG. 8 illustrates a structure diagram of an electronic device provided by an embodiment of the present disclosure.

The electronic device can include components such as a processor 601 with one or more processing cores, a memory 602 including one or more computer readable storage media, a power supply 603, and an input unit 604. Those skilled in the art can understand that the structure of the electronic device shown in FIG. 8 is not intended to form limits to the electronic device and can include components more or fewer than those shown in FIG. 8, or some components can be combined or different component arrangements can be adopted.

The processor 601 is a control center of the electronic device, connects various parts of the entire electronic device by using various interfaces and lines, and performs various functions of the electronic device and data processing by running or executing a software program and/or a module stored in the memory 602 and by invoking data stored in the memory 602, to perform overall monitoring on the electronic device. Optionally, the processor 601 can include one or more processing units. Preferably, an application processor and a modem processor can be integrated into the processor 601. The application processor mainly processes an operating system, a user interface, an application program and so on, and the modem processor mainly processes wireless communication. It can be understood that alternatively, the modem processor may not be integrated into the processor 601.

The memory 602 can be configured to store a software program and a module. The processor 601 executes various functional applications of the electronic device and data processing by running the software program and the module that are stored in the memory 602. The memory 602 can mainly include a program storage area and a data storage area. The program storage area can store an operating system, an application program required by at least one function (such as a sound play function or an image play function) and so on. The data storage area can store data created based on use of the electronic device and so on. In addition, the memory 602 can include a high-speed random access memory, and can further include a nonvolatile memory, for example, at least one magnetic disk storage device, a flash memory device, or another volatile solid-state storage device. Correspondingly, the memory 602 can further include a memory controller for the processor 601 to access the memory 602.

The electronic device further includes the power supply 603 for supplying power to the components. Preferably, the power supply 603 can be logically connected to the processor 601 by a power management system, thereby implementing functions such as charging, discharging, and power consumption management by the power management system. The power supply 603 can further include one or more of a direct current or alternating current power supply, a re-charging system, a power failure detection circuit, a power supply converter or inverter, a power supply state indicator, and any other component.

The electronic device can further include the input unit 604. The input unit 604 can be configured to receive input digital and character information and generate keyboard, mouse, joystick, optical or trackball signal input related to user setting and function control.

Although not shown in FIG. 8, the electronic device can further include a display unit and so on, which are not further described herein. Specifically, in the embodiment of the present disclosure, the processor 601 in the electronic device loads an executable file corresponding to one or more processes of an application to the memory 602 according to the following instructions, and the processor 601 runs an application stored in the memory 602, thereby implementing the following various functions of: obtaining a preset grayscale value, an initial color shift ratio, and a current color shift ratio of a sub pixel to be tested; obtaining an initial evaluation value of the preset grayscale value according to the initial color shift ratio, and obtaining a current evaluation value of the preset grayscale value according to the current color shift ratio; comparing the initial evaluation value with the current evaluation value; and determining a standard sub pixel voltage of the sub pixel to be test according to the current color shift ratio, when the current evaluation value is greater than the initial evaluation value.

Those skilled in the art can understand that all or some steps of various methods in the above-mentioned embodiments can be implemented through instructions, or implemented through instructions controlling relevant hardware. The instructions can be stored in a computer readable storage medium and loaded and executed by a processor.

As such, an embodiment of the present disclosure provides a computer readable storage medium. The storage medium can include: a read-only memory (ROM), a random access memory (RAM), a magnetic disk, an optical disc or the like. The storage medium includes computer programs stored thereon. The computer programs are loaded by a processor to perform the steps in the method for determining the pixel voltage in any one of the embodiments of the present disclosure. For example, the computer programs are loaded by the processor to perform the following steps of: obtaining a preset grayscale value, an initial color shift ratio, and a current color shift ratio of a sub pixel to be tested; obtaining an initial evaluation value of the preset grayscale value according to the initial color shift ratio, and obtaining a current evaluation value of the preset grayscale value according to the current color shift ratio; comparing the initial evaluation value with the current evaluation value; and determining a standard sub pixel voltage of the sub pixel to be test according to the current color shift ratio, when the current evaluation value is greater than the initial evaluation value.

Descriptions of the above-mentioned embodiments may emphasize on various aspects. A portion which is not described in details in one of the embodiments can be referred to other embodiments having relative descriptions and is not repeated herein.

For the specific implementation, the above-mentioned modules can be implemented as independent entities, or can be implemented in any combination, and can be implemented as the same or a plurality of entities. The specific implementation of the above-mentioned modules can be referred to the above-mentioned method embodiments and is not repeated herein.

The method for determining the pixel voltage, the electronic device, and the storage medium provided by the embodiments of the present disclosure are described in detail above. Although the principles and implementations of the present disclosure are described by using specific examples in this specification, the above-mentioned descriptions of the embodiments are only intended to help understand the method and the core idea of the method of the present disclosure. Moreover, those skilled in the art can make modifications to the specific implementations and an application range according to the idea of the present disclosure. In conclusion, the content of the specification is not intended to be construed as a limitation on the present disclosure.

What is claimed is:

1. A method for determining a pixel voltage, comprising:

obtaining a preset grayscale value, an initial color shift ratio, and a current color shift ratio of a sub pixel to be tested;

obtaining an initial evaluation value of the preset grayscale value according to the initial color shift ratio, and obtaining a current evaluation value of the preset grayscale value according to the current color shift ratio;

comparing the initial evaluation value with the current evaluation value; and determining a standard sub pixel voltage of the sub pixel to be test according to the current color shift ratio, when the current evaluation value is greater than the initial evaluation value, wherein the step of comparing the initial evaluation value with the current evaluation value further comprises:

obtaining an initial sub pixel voltage corresponding to the initial color shift ratio and a current sub pixel voltage corresponding to the current color shift ratio, when the initial evaluation value is equal to the current evaluation value;

comparing the initial sub pixel voltage with the current sub pixel voltage; and determining the initial sub pixel voltage as the standard sub pixel voltage of the sub pixel to be test, when the initial sub pixel voltage is smaller than the current sub pixel voltage.

2. The method for determining the pixel voltage of claim 1, wherein the step of comparing the initial evaluation value with the current evaluation value further comprises:

determining the standard sub pixel voltage of the sub pixel to be tested according to the initial color shift ratio, when the current evaluation value is smaller than the initial evaluation value.

3. The method for determining the pixel voltage of claim 1, wherein the preset grayscale value comprises at least a first sub grayscale value and a second sub grayscale value;

the initial color shift ratio comprises at least a first initial color shift ratio and a second initial color shift ratio, the first initial color shift ratio is an initial color shift ratio of the first sub grayscale value, and the second initial color shift ratio is an initial color shift ratio of the second sub grayscale value;

the initial evaluation value comprises at least a first initial evaluation value and a second initial evaluation value, the first initial evaluation value is an initial evaluation value of the first sub grayscale value, and the second initial evaluation value is an initial evaluation value of the second sub grayscale value; and the step of obtaining the initial evaluation value of the preset grayscale value according to the initial color shift ratio comprises:

obtaining the first initial evaluation value according to the first initial color shift ratio, and obtaining the second initial evaluation value according to the second initial color shift ratio;

comparing the first initial evaluation value with the second initial evaluation value;

serving the first initial evaluation value as the initial evaluation value of the preset grayscale value, when the first initial evaluation value is smaller than the second initial evaluation value; and serving the second initial evaluation value as the initial evaluation value of the preset grayscale value, when the first initial evaluation value is greater than the second initial evaluation value.

4. The method for determining the pixel voltage of claim 3, wherein the current evaluation value comprises at least a first current evaluation value and a second current evaluation value, the first current evaluation value is a current evaluation value of the first sub grayscale value, and the second current evaluation value is a current evaluation value of the second sub grayscale value; and the step of comparing the initial evaluation value with the current evaluation value comprises:

comparing the first initial evaluation value with the first current evaluation value, and comparing the second initial evaluation value with the second current evaluation value;

serving the first current evaluation value as a standard evaluation value of the first sub grayscale value, when the first current evaluation value is greater than the first initial evaluation value;

serving the second current evaluation value as a standard evaluation value of the second sub grayscale value, when the second current evaluation value is greater than the second initial evaluation value;

determining a standard sub pixel voltage of the first sub grayscale value according to the standard evaluation value of the first sub grayscale value and a color shift ratio corresponding to the standard evaluation value, and determining a standard sub pixel voltage of the second sub grayscale value according to the standard evaluation value of the second sub grayscale value and a color shift ratio corresponding to the standard evaluation value; and serving the standard sub pixel voltage of the first sub grayscale value and the standard sub pixel voltage of the second sub grayscale value as the standard sub pixel voltage of the sub pixel to be tested.

5. The method for determining the pixel voltage of claim 4, wherein the current color shift ratio includes at least a first current color shift ratio and a second current color shift ratio, the first current color shift ratio is a current color shift ratio of the first sub grayscale value, and the second current color shift ratio is a current color shift ratio of the second sub grayscale value; and after the step of comparing the first initial evaluation value with the first current evaluation value, and comparing the second initial evaluation value with the second current evaluation value, the method further comprises:

comparing the acquired first current evaluation value with the second initial evaluation value and the second current evaluation value;

comparing the second current color shift ratio with the second initial color shift ratio, when the second initial evaluation value and the second current evaluation value are both greater than the first current evaluation value; and determining the sub pixel voltage of the second sub grayscale value according to the second current color shift ratio.

6. The method for determining the pixel voltage of claim 1, wherein the step of obtaining the initial evaluation value of the preset grayscale value according to the initial color shift ratio and obtaining the current evaluation value of the preset grayscale value according to the current color shift ratio comprises:

obtaining angle data within a preset angle range;

obtaining initial measured gamma shift data according to the initial color shift ratio and the angle data, and obtaining current measured gamma shift data according to the current color shift ratio and the angle data;

obtaining an initial evaluation angle is obtained according to a preset gamma shift value and the measured gamma shift data, and obtaining a current evaluation angle according to the preset gamma shift value and the current gamma offset data; and obtaining the initial evaluation value according to a preset standard angle, and obtaining the current evaluation value according to the preset standard angle and the current evaluation angle.

7. An electronic device, wherein the electronic device comprises:

one or more processors;

a memory; and one or more applications, wherein the one or more applications are stored in the memory and configured to be executed by the processor to perform the following steps of:

obtaining a preset grayscale value, an initial color shift ratio, and a current color shift ratio of a sub pixel to be tested;

obtaining an initial evaluation value of the preset grayscale value according to the initial color shift ratio, and obtaining a current evaluation value of the preset grayscale value according to the current color shift ratio;

comparing the initial evaluation value with the current evaluation value; and determining a standard sub pixel voltage of the sub pixel to be test according to the current color shift ratio, when the current evaluation value is greater than the initial evaluation value, wherein the step of comparing the initial evaluation value with the current evaluation value further comprises:

obtaining an initial sub pixel voltage corresponding to the initial color shift ratio and a current sub pixel voltage corresponding to the current color shift ratio, when the initial evaluation value is equal to the current evaluation value;

comparing the initial sub pixel voltage with the current sub pixel voltage; and determining the initial sub pixel voltage as the standard sub pixel voltage of the sub pixel to be test, when the initial sub pixel voltage is smaller than the current sub pixel voltage.

8. The electronic device of claim 7, wherein the step of comparing the initial evaluation value with the current evaluation value further comprises:

determining the standard sub pixel voltage of the sub pixel to be tested according to the initial color shift ratio, when the current evaluation value is smaller than the initial evaluation value.

9. The electronic device of claim 7, wherein the preset grayscale value comprises at least a first sub grayscale value and a second sub grayscale value;

the initial color shift ratio comprises at least a first initial color shift ratio and a second initial color shift ratio, the first initial color shift ratio is an initial color shift ratio of the first sub grayscale value, and the second initial color shift ratio is an initial color shift ratio of the second sub grayscale value;

the initial evaluation value comprises at least a first initial evaluation value and a second initial evaluation value, the first initial evaluation value is an initial evaluation value of the first sub grayscale value, and the second initial evaluation value is an initial evaluation value of the second sub grayscale value; and the step of obtaining the initial evaluation value of the preset grayscale value according to the initial color shift ratio comprises:

obtaining the first initial evaluation value according to the first initial color shift ratio, and obtaining the second initial evaluation value according to the second initial color shift ratio;

comparing the first initial evaluation value with the second initial evaluation value;

serving the first initial evaluation value as the initial evaluation value of the preset grayscale value, when the first initial evaluation value is smaller than the second initial evaluation value; and serving the second initial evaluation value as the initial evaluation value of the preset grayscale value, when the first initial evaluation value is greater than the second initial evaluation value.

10. The electronic device of claim 9, wherein the current evaluation value comprises at least a first current evaluation value and a second current evaluation value, the first current evaluation value is a current evaluation value of the first sub grayscale value, and the second current evaluation value is a current evaluation value of the second sub grayscale value; and the step of comparing the initial evaluation value with the current evaluation value comprises:

comparing the first initial evaluation value with the first current evaluation value, and comparing the second initial evaluation value with the second current evaluation value;

serving the first current evaluation value as a standard evaluation value of the first sub grayscale value, when the first current evaluation value is greater than the first initial evaluation value;

serving the second current evaluation value as a standard evaluation value of the second sub grayscale value, when the second current evaluation value is greater than the second initial evaluation value;

determining a standard sub pixel voltage of the first sub grayscale value according to the standard evaluation value of the first sub grayscale value and a color shift ratio corresponding to the standard evaluation value, and determining a standard sub pixel voltage of the second sub grayscale value according to the standard evaluation value of the second sub grayscale value and a color shift ratio corresponding to the standard evaluation value; and serving the standard sub pixel voltage of the first sub grayscale value and the standard sub pixel voltage of the second sub grayscale value as the standard sub pixel voltage of the sub pixel to be tested.

11. The electronic device of claim 10, wherein the current color shift ratio includes at least a first current color shift ratio and a second current color shift ratio, the first current color shift ratio is a current color shift ratio of the first sub grayscale value, and the second current color shift ratio is a current color shift ratio of the second sub grayscale value; and after the step of comparing the first initial evaluation value with the first current evaluation value, and comparing the second initial evaluation value with the second current evaluation value, the method further comprises:

comparing the acquired first current evaluation value with the second initial evaluation value and the second current evaluation value;

comparing the second current color shift ratio with the second initial color shift ratio, when the second initial evaluation value and the second current evaluation value are both greater than the first current evaluation value; and determining the sub pixel voltage of the second sub grayscale value according to the second current color shift ratio.

12. The electronic device of claim 7, wherein the step of obtaining the initial evaluation value of the preset grayscale value according to the initial color shift ratio and obtaining the current evaluation value of the preset grayscale value according to the current color shift ratio comprises:

obtaining angle data within a preset angle range;

obtaining initial measured gamma shift data according to the initial color shift ratio and the angle data, and obtaining current measured gamma shift data according to the current color shift ratio and the angle data;

obtaining an initial evaluation angle is obtained according to a preset gamma shift value and the measured gamma shift data, and obtaining a current evaluation angle according to the preset gamma shift value and the current gamma offset data; and obtaining the initial evaluation value according to a preset standard angle, and obtaining the current evaluation value according to the preset standard angle and the current evaluation angle.

13. A non-transitory computer readable storage medium, comprising computer programs stored thereon, wherein the computer programs are loaded by a processor to perform the following steps of:

obtaining a preset grayscale value, an initial color shift ratio, and a current color shift ratio of a sub pixel to be tested;

obtaining an initial evaluation value of the preset grayscale value according to the initial color shift ratio, and obtaining a current evaluation value of the preset grayscale value according to the current color shift ratio;

comparing the initial evaluation value with the current evaluation value; and determining a standard sub pixel voltage of the sub pixel to be test according to the current color shift ratio, when the current evaluation value is greater than the initial evaluation value, wherein the step of comparing the initial evaluation value with the current evaluation value further comprises:

obtaining an initial sub pixel voltage corresponding to the initial color shift ratio and a current sub pixel voltage corresponding to the current color shift ratio, when the initial evaluation value is equal to the current evaluation value;

comparing the initial sub pixel voltage with the current sub pixel voltage; and determining the initial sub pixel voltage as the standard sub pixel voltage of the sub pixel to be test, when the initial sub pixel voltage is smaller than the current sub pixel voltage.

14. The non-transitory computer readable storage medium of claim 13, wherein the step of comparing the initial evaluation value with the current evaluation value further comprises:

determining the standard sub pixel voltage of the sub pixel to be tested according to the initial color shift ratio, when the current evaluation value is smaller than the initial evaluation value.

15. The non-transitory computer readable storage medium of claim 13, wherein the preset grayscale value comprises at least a first sub grayscale value and a second sub grayscale value;

the initial color shift ratio comprises at least a first initial color shift ratio and a second initial color shift ratio, the first initial color shift ratio is an initial color shift ratio of the first sub grayscale value, and the second initial color shift ratio is an initial color shift ratio of the second sub grayscale value;

the initial evaluation value comprises at least a first initial evaluation value and a second initial evaluation value, the first initial evaluation value is an initial evaluation value of the first sub grayscale value, and the second initial evaluation value is an initial evaluation value of the second sub grayscale value; and the step of obtaining the initial evaluation value of the preset grayscale value according to the initial color shift ratio comprises:

obtaining the first initial evaluation value according to the first initial color shift ratio, and obtaining the second initial evaluation value according to the second initial color shift ratio;

comparing the first initial evaluation value with the second initial evaluation value;

serving the first initial evaluation value as the initial evaluation value of the preset grayscale value, when the first initial evaluation value is smaller than the second initial evaluation value; and serving the second initial evaluation value as the initial evaluation value of the preset grayscale value, when the first initial evaluation value is greater than the second initial evaluation value.

16. The non-transitory computer readable storage medium of claim 15, wherein the current evaluation value comprises at least a first current evaluation value and a second current evaluation value, the first current evaluation value is a current evaluation value of the first sub grayscale value, and the second current evaluation value is a current evaluation value of the second sub grayscale value; and the step of comparing the initial evaluation value with the current evaluation value comprises:

comparing the first initial evaluation value with the first current evaluation value, and comparing the second initial evaluation value with the second current evaluation value;

serving the first current evaluation value as a standard evaluation value of the first sub grayscale value, when the first current evaluation value is greater than the first initial evaluation value;

serving the second current evaluation value as a standard evaluation value of the second sub grayscale value, when the second current evaluation value is greater than the second initial evaluation value;

determining a standard sub pixel voltage of the first sub grayscale value according to the standard evaluation value of the first sub grayscale value and a color shift ratio corresponding to the standard evaluation value, and determining a standard sub pixel voltage of the second sub grayscale value according to the standard evaluation value of the second sub grayscale value and a color shift ratio corresponding to the standard evaluation value; and serving the standard sub pixel voltage of the first sub grayscale value and the standard sub pixel voltage of the second sub grayscale value as the standard sub pixel voltage of the sub pixel to be tested.

17. The non-transitory computer readable storage medium of claim 16 wherein the current color shift ratio includes at least a first current color shift ratio and a second current color shift ratio, the first current color shift ratio is a current color shift ratio of the first sub grayscale value, and the second current color shift ratio is a current color shift ratio of the second sub grayscale value; and after the step of comparing the first initial evaluation value with the first current evaluation value, and comparing the second initial evaluation value with the second current evaluation value, the method further comprises:

comparing the acquired first current evaluation value with the second initial evaluation value and the second current evaluation value;

comparing the second current color shift ratio with the second initial color shift ratio, when the second initial evaluation value and the second current evaluation value are both greater than the first current evaluation value; and determining the sub pixel voltage of the second sub grayscale value according to the second current color shift ratio.

* * * * *